US012600469B2

(12) United States Patent
Schuster et al.

(10) Patent No.: US 12,600,469 B2
(45) Date of Patent: Apr. 14, 2026

(54) PROPULSOR EXTERNAL HYDRAULIC CONTROL SYSTEM

(71) Applicant: Lockheed Martin Corporation, Bethesda, MD (US)

(72) Inventors: Daniel George Schuster, Bethlehem, CT (US); David N. Schmaling, Southbury, CT (US); Evan S. Tobin, Shelton, CT (US); Eric M. Bogert, Wallingford, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 34 days.

(21) Appl. No.: 18/239,711

(22) Filed: Aug. 29, 2023

(65) Prior Publication Data

US 2025/0074583 A1     Mar. 6, 2025

(51) Int. Cl.
| | |
|---|---|
| *B64C 27/80* | (2006.01) |
| *B64C 11/38* | (2006.01) |
| *B64C 27/10* | (2023.01) |
| *B64C 27/64* | (2006.01) |
| B64C 27/82 | (2006.01) |

(52) U.S. Cl.
CPC .............. *B64C 27/80* (2013.01); *B64C 11/38* (2013.01); *B64C 27/10* (2013.01); *B64C 27/64* (2013.01); *B64C 2027/8236* (2013.01)

(58) Field of Classification Search
CPC ... B64C 27/64; B64C 11/38; B64C 27/54–80; B64C 11/30–44; B64C 27/82; B64C 2027/8209–8236; B64C 2027/8254; F15B 15/149
See application file for complete search history.

(56) References Cited

U.S. PATENT DOCUMENTS

| | | | | |
|---|---|---|---|---|
| 5,415,525 A | * | 5/1995 | Desjardins | B64C 27/82 |
| | | | | 416/168 R |
| 5,478,204 A | | 12/1995 | Desjardins et al. | |
| 7,758,310 B2 | | 7/2010 | Cotton et al. | |
| 7,926,759 B2 | * | 4/2011 | Muylaert | B64C 27/82 |
| | | | | 416/138 |
| 10,543,901 B2 | | 1/2020 | Miskiewicz et al. | |
| 10,793,255 B2 | | 10/2020 | Miszkiewicz | |
| 2005/0086934 A1 | * | 4/2005 | Tosen | F15B 21/008 |
| | | | | 60/413 |
| 2012/0186442 A1 | * | 7/2012 | Chung | F15B 15/149 |
| | | | | 92/52 |
| 2020/0385107 A1 | | 12/2020 | Bowles et al. | |
| 2023/0322375 A1 | * | 10/2023 | Benner | B64C 27/605 |
| | | | | 244/17.23 |

* cited by examiner

*Primary Examiner* — Ashesh Dangol
(74) *Attorney, Agent, or Firm* — Foley & Lardner LLP

(57) ABSTRACT

A rotor assembly for a rotary wing aircraft includes a rotor hub including a hub arm and a central opening. The rotor assembly further includes a hydraulic actuation cylinder positioned in the central opening, a pitch change shaft assembly including a pitch change shaft positioned partially within the hydraulic actuation cylinder, a pitch beam coupled to a distal end of the pitch change shaft and configured to be coupled to a rotor blade rotatably mounted to the hub arm. The rotor assembly additionally includes at least one guide rod coupled to the rotor hub and slidably coupled to an opening in the pitch change shaft.

18 Claims, 7 Drawing Sheets

PROPULSOR EXTERNAL HYDRAULIC CONTROL SYSTEM

STATEMENT REGARDING FEDERALLY SPONSORED RESEARCH OR DEVELOPMENT

This invention was made with Government support under Agreement No. W911W6-19-9-0005, awarded by the Army Contracting Command-Redstone Arsenal. The Government has certain rights in the invention.

FIELD

The present application relates generally to pitch control system for propulsor blades in a rotary propulsor system.

BACKGROUND

Rotary propulsor systems include rear-facing rotor blades disposed at the tail of an airframe. Such systems generally assist with the generation of forward thrust, although rotary propulsor systems may also generate lift and provide for additional yaw control. The pitch of the rotor blades can be adjusted.

SUMMARY OF THE INVENTION

The present disclosure describes a rotor assembly for a propulsor of a rotary wing aircraft that controls the pitch of the propulsor blades using a hydraulic actuation system. Hydraulic fluid is provided to a hydraulic cylinder to adjust the position of a piston coupled to a pitch change shaft. In some embodiments, the rotor assembly includes guide rods to provide additional resistance to bending loads, and the hydraulic piston may extend into the propulsor hub and the body of the pitch change shaft.

In general, systems for adjusting the pitch of rotor or propulsor blades may include electromechanical or hydraulic actuators that are coupled to a pitch change shaft via a misalignment link and bearing assembly to enable the rotation of the rotor hub. This bearing assembly can increase the size of the pitch change assembly, the rotor hub output shaft and associated components, adding weight and reducing the weight efficiency of the rotor system. The systems of the present disclosure use a hydraulic actuation system, or equivalent, with an external pitch beam to adjust the blade pitch and do not require a pitch change shaft bearing assembly inside the gearbox, allowing for the use of smaller, lighter components for improved aircraft efficiency and performance.

In an exemplary aspect, a rotor assembly for a rotor blade for a rotary wing aircraft is provided. The rotor assembly includes a rotor hub including a hub arm and a central opening, a hydraulic actuation cylinder positioned in the central opening, a pitch change shaft assembly including a pitch change shaft positioned partially within the hydraulic actuation cylinder, a pitch beam coupled to a distal end of the pitch change shaft and configured to be coupled to the rotor blade rotatably mounted to the hub arm, and at least one guide rod coupled to the rotor hub and slidably coupled to an opening in the pitch change shaft.

In another exemplary aspect, a propeller assembly for a rotary wing aircraft is provided. The propeller assembly includes a rotor hub configured to be rotated along a rotor axis by an engine or a motor, the rotor hub including a hub arm, a rotor blade rotatably coupled to the hub arm about a hub arm axis, a pitch change shaft configured to translate along the rotor axis, a pitch beam coupled to the pitch change shaft and including a first arm extending radially from the pitch change shaft, a first guide rod fixedly coupled to the rotor hub and slidably coupled to the pitch beam, the first guide rod extending parallel to the rotor axis, and a pitch link coupled to a distal end of the first arm and to the rotor blade, the pitch link configured to rotate the rotor blade about the hub arm axis adjust a pitch of the rotor blade when the pitch change shaft translates along the rotor axis.

In another exemplary aspect, a rotary wing aircraft is provided. The rotary wing aircraft includes a fuselage, a main rotor assembly coupled to the fuselage including at least one main rotor blade, and a propulsor assembly coupled to the fuselage. The propulsor assembly includes a hydraulic pump, an engine or a motor configured to rotate a rotor hub about a rotor axis, the rotor hub including a rotor shaft and a central opening each positioned around the rotor axis, a hydraulic actuation cylinder positioned in the central opening of the rotor hub and including an inner cavity, a first hydraulic line extending through the rotor shaft from the hydraulic pump to a first chamber of the inner cavity, a second hydraulic line extending through the rotor shaft from the hydraulic pump to a second chamber of the inner cavity, and a pitch change assembly configured to translate along the rotor axis in response to a difference in hydraulic pressure between the first chamber and the second chamber, wherein a proximal end of the pitch change assembly is positioned in the inner cavity.

It will be recognized that the figures are the schematic representations for purposes of illustration. The figures are provided for the purpose of illustrating one or more implementations with the explicit understanding that the figures will not be used to limit the scope of the meaning of the claims.

DETAILED DESCRIPTION

Figure 1:
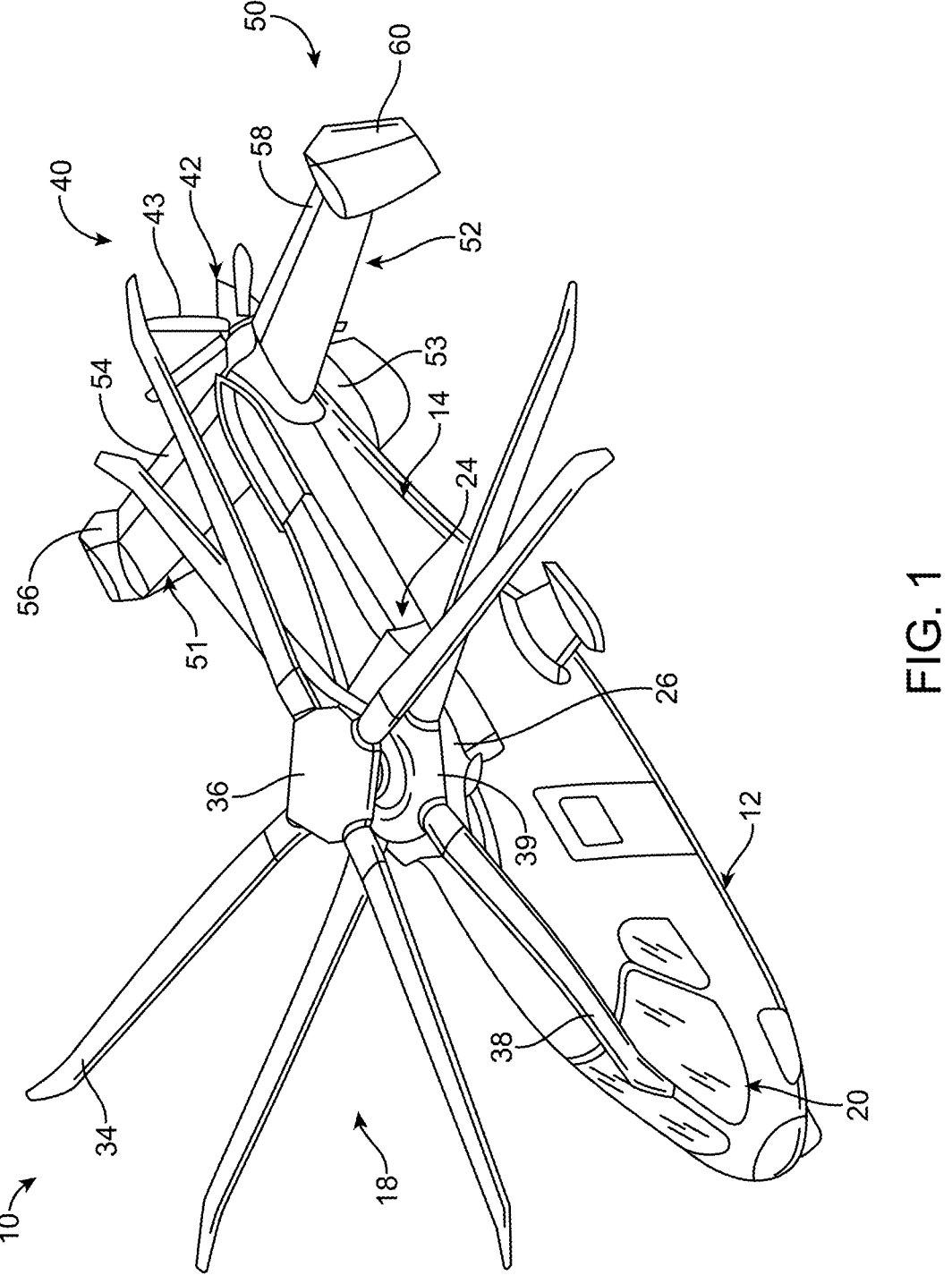
FIG. 1 is a perspective view of a rotary wing aircraft.

FIG. 1 is perspective view of a rotary wing aircraft in accordance with an example embodiment. More particularly, FIG. 1 depicts an exemplary aircraft as shown and described in U.S. Patent Pub. No. 2020/0385107 A1, which is incorporated by reference herein in its entirety for the overall aircraft system shown therein and construction thereof. FIG. 1 depicts an exemplary embodiment of a rotary wing, vertical takeoff and landing (VTOL) aircraft 10. Aircraft 10 includes an airframe or fuselage 12 having a plurality of surfaces with an extending tail 14. A coaxial main rotor assembly 18 is located at the fuselage 12 and rotates about a main rotor axis, A. In an exemplary embodiment, the fuselage 12 includes a cockpit 20 having seats for flight crew (e.g., pilot and co-pilot) and passengers. Main rotor assembly 18 is driven by a power source, for example, one or more engines 24, via a gearbox 26. Main rotor assembly 18 includes an upper rotor assembly 28 that may be driven in a first direction (e.g., counter-clockwise) about the main rotor axis, A, and a lower rotor assembly 32 that may be driven in a second direction (e.g., clockwise) about the main rotor axis, A, opposite to the first direction (i.e., counter rotating rotors). Upper rotor assembly 28 includes a first plurality of rotor blades 34 supported by a first or upper rotor hub 36. Lower rotor assembly 32 includes a second plurality of rotor blades 38 supported by a second or lower rotor hub 39.

In some embodiments, aircraft 10 may include a translational thrust system 40 having a propulsor assembly 42 or a propeller located at extending tail 14 to provide translational thrust (forward or rearward) for aircraft 10. Propulsor assembly 42 includes a plurality of propulsor blades 43. Although a particular aircraft configuration is illustrated in this non-limiting embodiment, other configurations may be employed (e.g., although the dual rotor system is depicted as coaxial, embodiments include dual rotor aircraft having non-coaxial rotors). Propulsor assembly 42 or translational thrust system 40 is connected to and driven by the engine 24 via the gearbox 26. In accordance with another aspect of an exemplary embodiment, extended tail 14 includes a tail section 50 including starboard and port horizontal stabilizers 51 and 52. Tail section 50 also includes a vertical stabilizer 53 that extends downward from extending tail 14. Starboard horizontal stabilizer 51 includes a starboard active elevator 54 and a starboard active rudder 56. Similarly, port horizontal stabilizer 52 includes a port active elevator 58 and a port active rudder 60. Elevators 54 and 58 and rudders 56 and 60 act as controllable surfaces, e.g., surfaces that alter a flight path/characteristics of aircraft 10.

Figure 2:
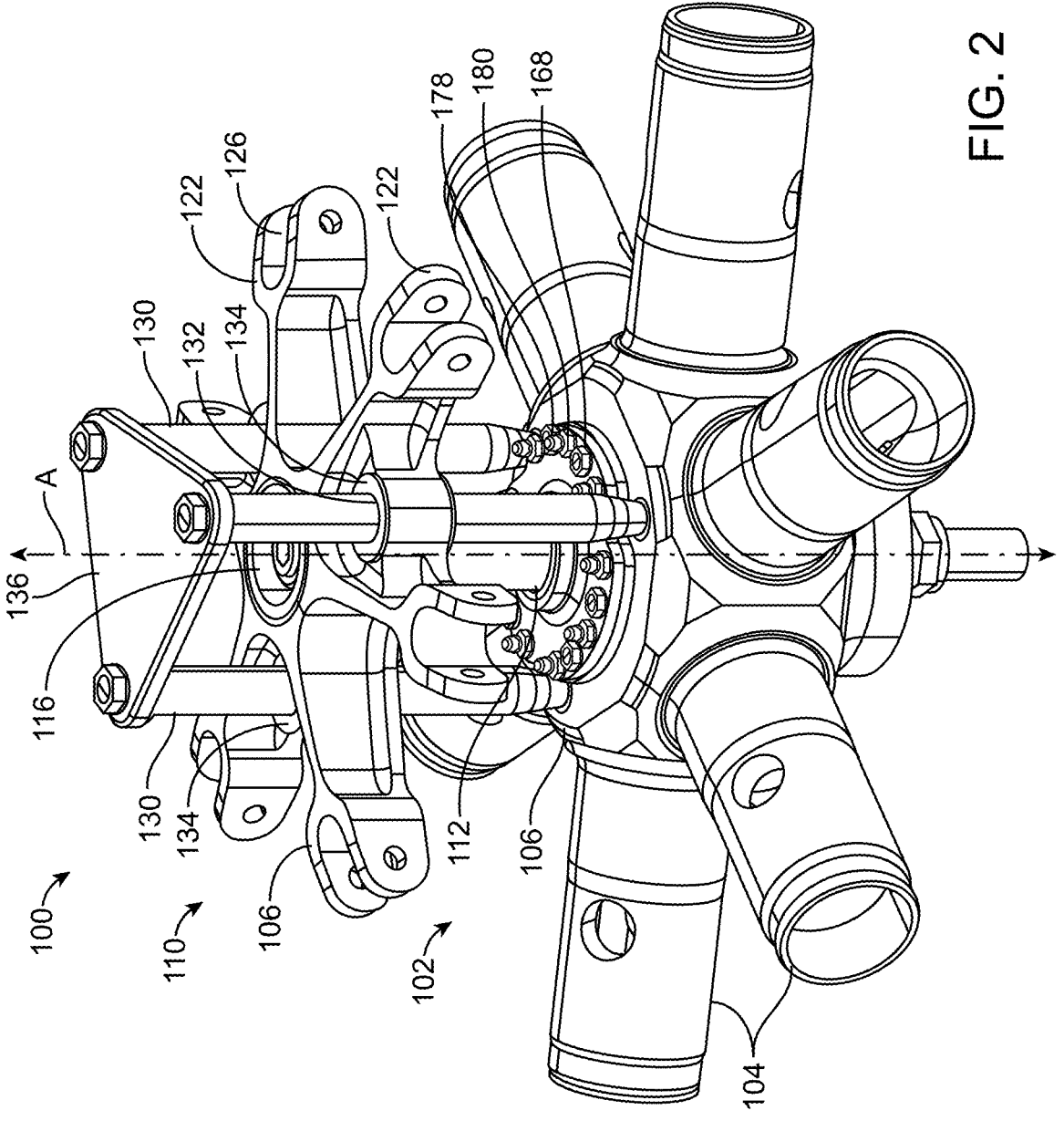
FIG. 2 is a perspective view of a propulsor hub system, according to some embodiments.
Figure 3:
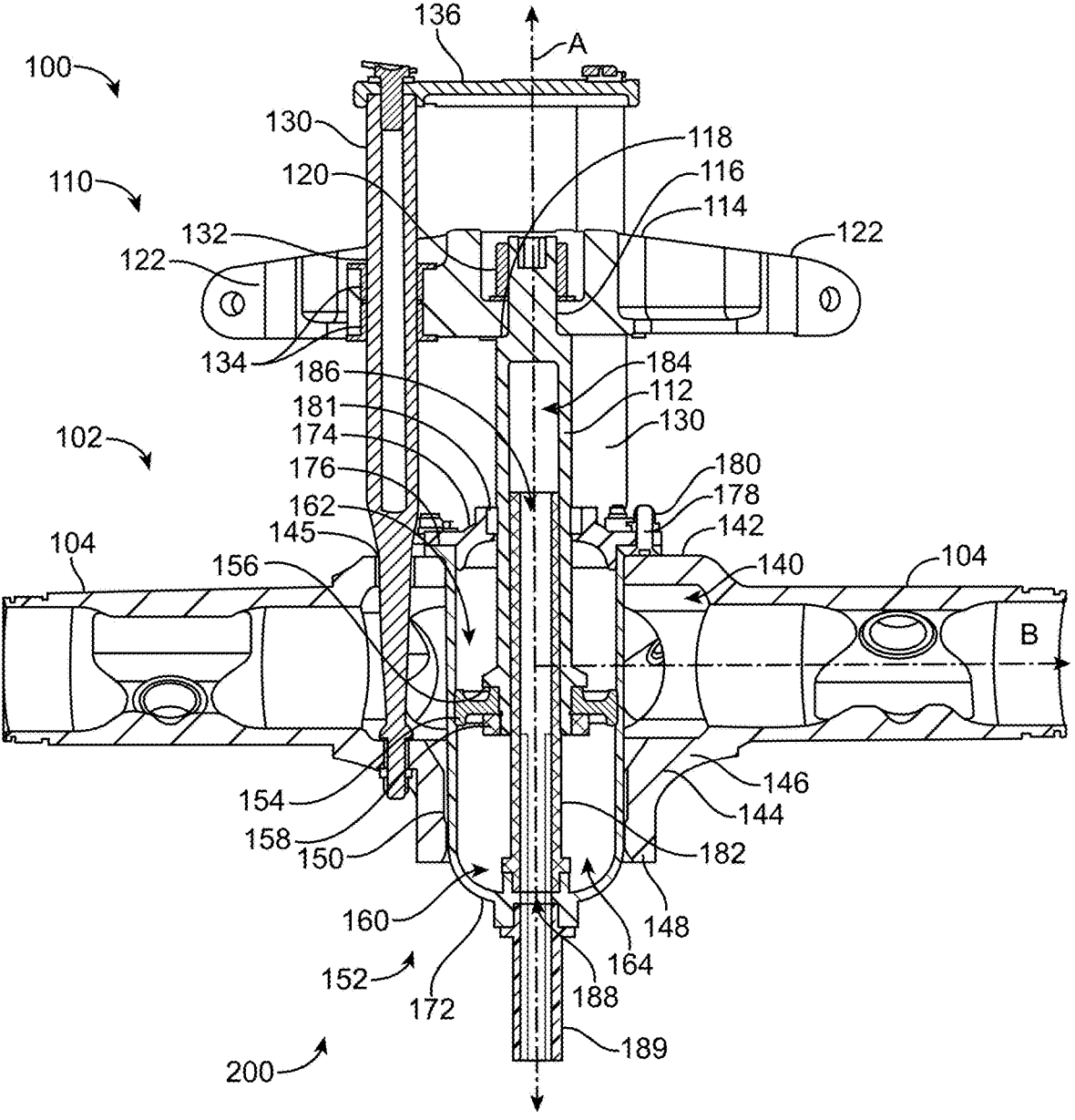
FIG. 3 is a section view of the propulsor hub system of FIG. 2.

Referring to FIGS. 1-3, a propulsor hub system 100 for a rotary wing aircraft (e.g., rotary wing aircraft 10) is shown, according to some embodiments. The propulsor hub system 100 is configured to be driven by the engine 24 via the gearbox 26 to rotate about a hub axis A. The propulsor hub system 100 is configured to be attached to and spin propulsor blades 43 of the propulsor assembly 42 that provide a propulsive force to the rotary wing aircraft 10. The propulsor hub system 100 includes a propulsor hub body 102. The propulsor hub body 102 may include a hub bowl 106 defining a central structure of the hub body 102. A plurality of hub arms 104 may extend radially from the hub bowl 106. As shown in FIG. 2, the hub body 102 includes six hub arms 104. However, in some embodiments, the hub body 102 may include more or fewer hub arms 104. The hub arms 104 may be substantially cylindrical. The hub arms 104 are configured to receive the propulsor blades 43 of a rotary wing aircraft (e.g., rotary wing aircraft 10). For example, the root ends of the propulsor blades 43 may be substantially cylindrical and hollow and may slide over the cylindrical hub arms 104. The inner diameter of the hollow propulsor blade roots may be slightly larger than the outer diameter of the hub arms 104, such that each propulsor blade 43 may be rotatably coupled to a hub arm 104 about a longitudinal axis of the hub arm 104. The hub system 100 may include a pitch control system 110. The pitch control system 110 is configured to adjust the pitch of the propulsor blades 43 coupled to the hub arms 104. For example, the pitch control system 110 may apply a torsional force to each propulsor blade 43 about the longitudinal axis B (as shown in FIG. 3) of the respective hub arm 104, thus adjusting the pitch of the blade 43.

Figure 6:
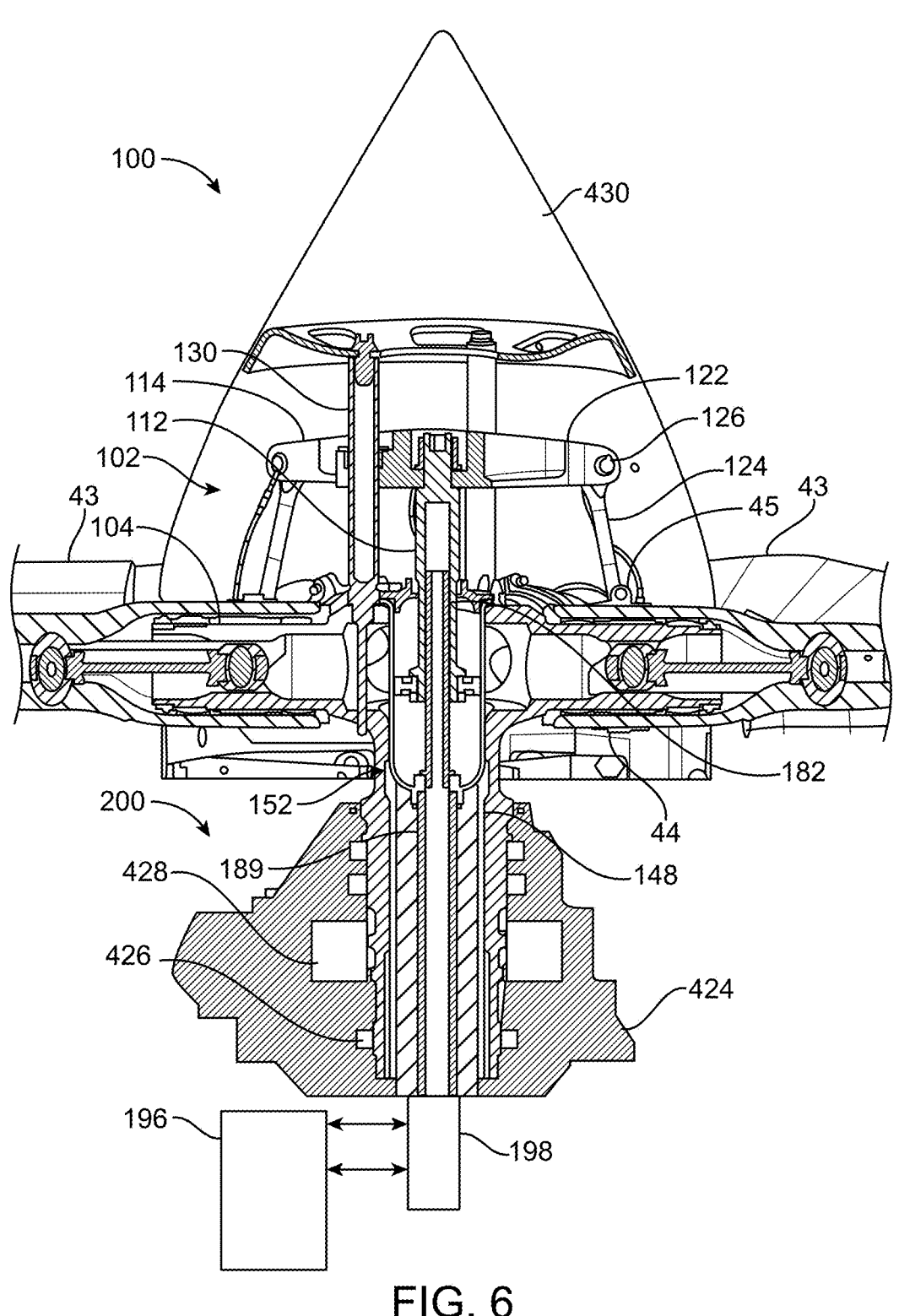
FIG. 6 is a section view of a propulsor assembly incorporating the propulsor hub system of FIG. 2, according to some embodiments.

The pitch control system 110 includes a pitch change shaft 112 coupled to a pitch beam 114. The pitch change shaft 112 may be positioned about the hub axis A, and in some embodiments, may be substantially cylindrical. The pitch change shaft 112 may be configured to move along the hub axis A (e.g., up and down as shown in FIG. 3) in response to control inputs to the control system of the rotary wing aircraft 10. The pitch beam 114 may be coupled to the distal end of the pitch change shaft 112 and may move along the hub axis A along with the pitch change shaft 112. For example, the pitch beam 114 may include a center mounting hole 116 sized to fit over the distal end of the pitch change shaft 112. The pitch beam 114 may be fastened to the pitch change shaft 112 between a shoulder 118 near the distal end of the of the pitch change shaft 112 a nut 120. The pitch beam 114 may include a plurality of pitch beam arms 122 extending radially from the center mounting hole 116. In some embodiments, the pitch beam 114 may include the same number of pitch beam arms 122 as the number of hub arms 104 or a different number of pitch beam arms 122. As shown in FIG. 6, the distal end of each pitch beam arm 122 may be coupled to a respective propulsor blade 43 by a pitch control rod 124 (e.g., a pitch link) at a position offset from the longitudinal axis of the propulsor blade 43. For example, as shown in FIG. 6, each propulsor blade 43 may have a coupling 44 with a mounting bracket 45. The linkages 124 may couple the distal ends of the pitch beam arms 122 to the mounting bracket 45. Each linkage 124 may be secured at a first end to a first clevis 126 of the respective pitch beam arm 122, and at a second end to the mounting bracket 45 of the respective propulsor blade 43. When the pitch beam 114 moves along the hub axis A (e.g., up and down as shown in FIG. 3), the linkages 124 pull or push their respective propulsor blade mounting brackets 45. Because the longitudinal axes of the linkages 124 are offset from the longitudinal axes B of the hub arms 104, the pushing or pulling causes the propulsor blades 43 to rotate about the longitudinal axis B of the hub arm 104, causing the pitch of the propulsor blade 43 to change.

The pitch control system 110 may include a one or more guide rods 130 coupled to the hub bowl 102 and extending from the hub bowl 102 in a direction parallel to the hub axis A. Each guide rod 130 may extend through a respective opening 132 in the pitch beam 114. The diameter of the openings 132 may be slightly larger than the diameter of the guide rods, such that the pitch beam 114 can slide along (e.g., is slidably coupled to) the guide rods 130 in the longitudinal direction of the hub axis A but is substantially retained and unable to move (i.e., is constrained so as to be fixed) in a radial direction relative to the hub axis A. in some embodiments, one or more bearings 134 (e.g., sleeve bearings, linear bearings, liner bearings, etc.) may be positioned in each opening 132 to ensure a close fit and to reduce friction between the guide rods 130 and the pitch beam 114. In some embodiments, the guide rods 130 may be coupled together at their distal ends by a guide rod alignment plate 136 to provide additional rigidity to resist bending loads. In some embodiments, the pitch control system 110 may include three guide rods 130. In some embodiments, the pitch control system may include more or fewer guide rods 130.

Referring now to FIG. 3, the interior of the hub bowl 106 is shown in further detail, according to some embodiments. The hub bowl 106 may be substantially hollow, thus defining an interior cavity 140. The hub bowl 106 may include a first flange 142 defining a first side of the hub bowl 106 and a second flange 144 defining a second side of the hub bowl 106, with the interior cavity positioned between the flanges 142, 144. The second flange may include a first portion 146 parallel to the first flange 142 and a hub root 148 (e.g., a drive shaft, a propulsor shaft, a propeller shaft, etc.) perpendicular to the first flange 142 and the first portion 146, the hub root 148 defining a root end of the hub body 102. It should be understood that the hub root 148 is shortened in FIGS. 2 and 3 to simplify the figures but is shown in full in FIG. 6. In some embodiments, the guide rods 130 extend across the interior cavity and are coupled to the first portion 146 of the second flange 144. The guide rods may extend through holes 145 in the first flange 144. The first and second flanges 144, 146 thus provide a moment couple to the guide rods 130 to resist bending forces. The hub root 148 of the second flange 144 may be coupled to a motor or engine (e.g., via a gearbox) to drive the rotation of the hub system 100. The hub bowl 106 may include a central opening 150 extending through the first flange 142 and the second flange 144. The central opening 150 may be substantially circular and may be positioned at the center of the hub body and extend along the hub axis A. A hydraulic actuation system 200 may be positioned substantially within in the central opening and may extend through the interior cavity 140 of the hub bowl 106. The hydraulic actuation system 200 may be used to control the position of the pitch change shaft 112 and the pitch beam 114.

The hydraulic actuation system 200 may include a piston canister 152 (e.g., a hydraulic actuation cylinder, a hydraulic cylinder, etc.) and a piston 154. The hydraulic actuation system 200 may be configured to actuate the pitch change shaft 112 by controlling the hydraulic pressure in the piston canister. The piston canister 152 may include a canister body 172 coupled to a canister lid 174 forming an inner cavity 160. The canister body 172 may include a flange 176 configured to be coupled to the first flange 142 of the hub bowl 106. The canister lid 174 may be substantially annular and may also be coupled to the flange 176 of the canister body 172. For example, a plurality of fasteners 178 (e.g., bolts, countersunk bolts, counterbored bolts, etc.) may be inserted through openings in the flange 176 and the canister lid 174, and each fastener 178 may be coupled to a nut 180, such that the canister body 172 and the canister lid 174 may be coupled together. A second plurality of fasteners 168 (e.g., bolts, screws, etc.) may extend through a second set of openings in the flange 176 and the canister lid 174 and may be coupled to threaded holes in first flange 142 of the hub bowl 106. Alternatively, the second plurality of fasteners 168 may extend through openings in the first flange 142 and be coupled to nuts in the interior cavity 140 of the hub bowl 106. The inner diameter of the canister lid 174 may be slightly larger than the outer diameter of the pitch change shaft 112, such that the canister lid 174 forms a fluidic seal with the outer surface of the pitch change shaft 112. In some embodiments, the hydraulic actuation system 200 may include a seal member 181, which forms the fluidic seal between the canister lid 174 and the pitch change shaft 112.

In some embodiments, the canister body 172 may be substantially cylindrical. The piston 154 may be substantially annular, with an outer diameter that is slightly smaller than the inner diameter of the canister body 172, such that the piston 154 forms a fluidic seal with and is slidably coupled to the inner wall of the canister body 172. In other embodiments, the canister body 172 and/or the piston 154 may be shaped differently. The piston 154 may be coupled to a proximal end of the pitch change shaft 112. For example, the piston 154 may be fastened to the pitch change shaft 112 between a shoulder 156 near the proximal end of the of the pitch change shaft 112 a nut 158. The pitch change shaft 112, the piston 154, and the nut 158 may collectively form a pitch change shaft assembly configured to translate along the hub axis A. The piston 154 may have an inner diameter that is slightly larger than the outer diameter of the pitch change shaft 112, such that the piston 154 forms a fluidic seal with the outer surface of the pitch change shaft 112. In some embodiments, the nut 158 and/or the shoulder 156 may cooperatively form the fluidic seal with the piston 154. The piston 154 may divide the inner cavity 160 of the piston canister 152 into a first chamber 162 and a second chamber 164. The first chamber 162 may be positioned on the pitch beam side of the piston 154, and the second chamber 164 may be positioned on the hub root side of the piston 154.

When the hydraulic pressure in the first chamber 162 exceeds the hydraulic pressure in the second chamber 164, the piston 154 is pushed in the direction of the hub root, thereby moving the pitch change shaft 112 and the pitch beam 114 in the direction of the hub root 148, and retracting the pitch change shaft 112 further into the piston canister 152. When the hydraulic pressure in the second chamber 164 exceeds the hydraulic pressure in the first chamber 162, the piston 154 is pushed in the direction of the pitch beam 114 (e.g., the opposite direction), thereby moving the pitch change shaft 112 and the pitch beam 114 in the direction of the pitch beam 114 and extending the pitch change shaft 112 away from the piston canister 152. Thus, by controlling the hydraulic pressure in the first and second chambers 162, 164 of the piston canister 152, the pitch of the propulsor blades 43 can be adjusted.

The hydraulic actuation system 200 may include a fluid supply shaft 182 configured to deliver hydraulic fluid to the chambers 162, 164 of the piston canister 152. The fluid supply shaft 182 may extend into an internal longitudinal bore 184 of the pitch change shaft 112 and may have a slightly smaller diameter than the internal bore 184, such that the fluid supply shaft 182 is slidably coupled to the pitch change shaft 112, and a fluidic seal is formed between the outer wall of the fluid supply shaft 182 and the inner wall of the pitch change shaft 112. Hydraulic fluid may be supplied into an inner cavity 186 of the fluid supply shaft 182 via the outer supply shaft 189 and one or more openings 188 at the root end of the piston canister body 172. In some embodiments, the fluid supply shaft 182 may include multiple fluid channels to allow hydraulic fluid to flow into and out of the chambers 162, 164. For example, the fluid supply shaft 182 and the outer supply shaft 189 may include outer fluid supply channels that supply fluid to the second chamber 164 and inner supply channels extending through the outer supply channels that supply fluid to the first chamber 162. Such an embodiment is shown in further detail in FIG. 4.

Figure 4:
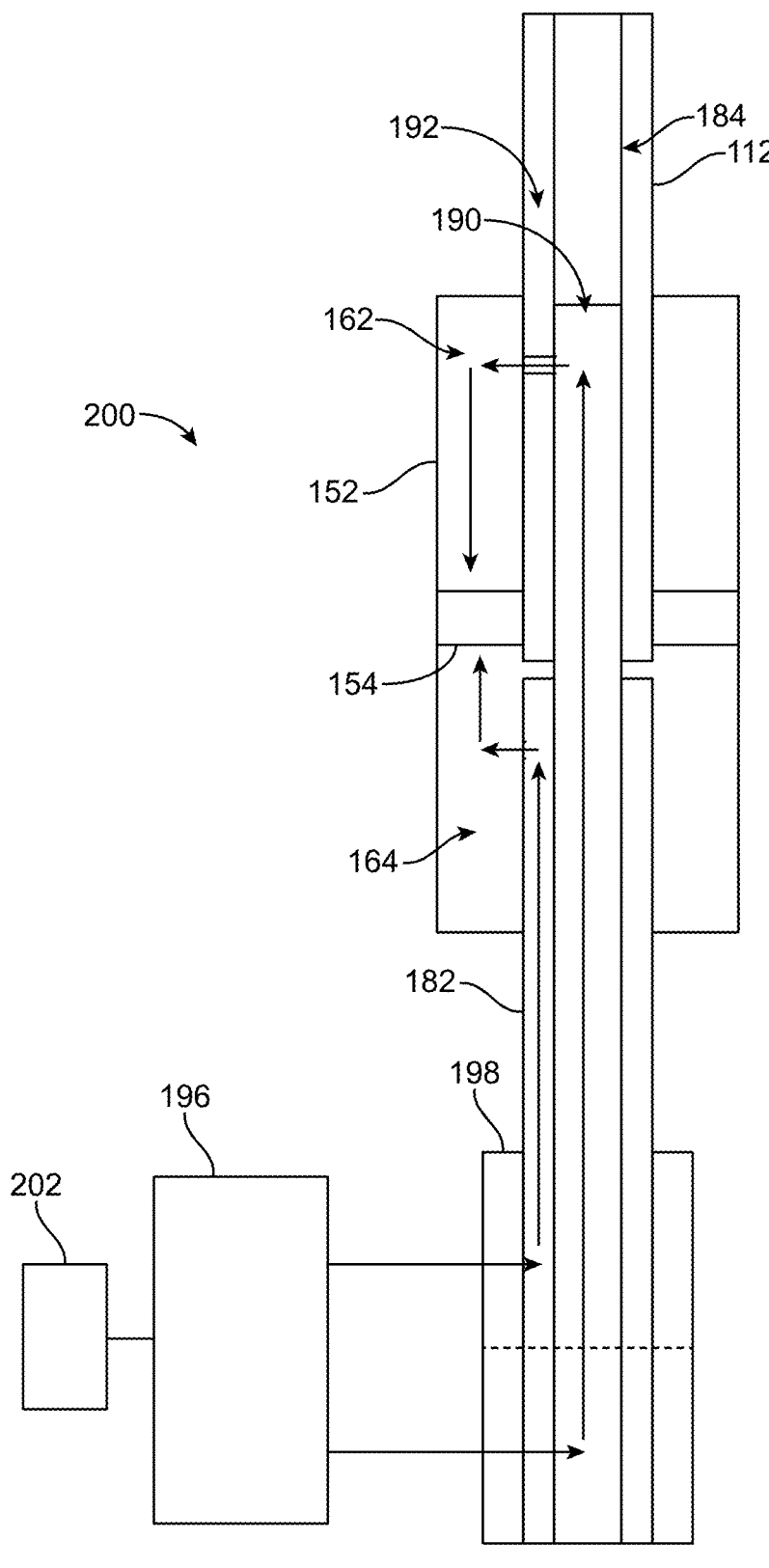
FIG. 4 is a schematic view of a hydraulic actuation system of the propulsor hub system of FIG. 2.

FIG. 4 shows a schematic view of the hydraulic actuation system 200, according to some embodiments. In some embodiments, a first hydraulic line may deliver hydraulic fluid to the first chamber 162, and a second hydraulic line may deliver hydraulic fluid to the second chamber 164. For example, in the embodiment shown in FIG. 4, the fluid supply shaft 182 includes an inner shaft 190 disposed within an outer shaft 192. The inner shaft 190 may deliver hydraulic fluid to the first chamber 162, and the outer shaft 192 may deliver hydraulic fluid to the second chamber 164. Alternatively, the inner shaft 190 may deliver hydraulic fluid to the second chamber 164, and the outer shaft 192 may deliver hydraulic fluid to the first chamber 162. The outer shaft 192 may include holes in the outer wall to deliver fluid into one of the chambers 162, 164. The inner shaft 190 may be fluidly coupled to an output conduit that passes through the outer shaft to the other of the chambers 162, 164.

In some embodiments, the fluid supply shaft 182 may not include an inner shaft 190 and an outer shaft 192. For example, the fluid supply shaft 182 may be longitudinally bisected by a plate, and fluid may be supplied to the first chamber 162 on a first side of the plate, and to the second chamber 164 on the other side of the plate. In some embodiments, hydraulic hoses may be positioned in the inner cavity 186 of the fluid supply shaft 182 and coupled to the inner wall of the fluid supply shaft 182. The wall of the pitch change shaft 112 may include one or more openings configured to align with one or more openings in the supply shaft 182, such that hydraulic fluid can pass through the wall of the pitch change shaft 112 into the chambers 162, 164 as the pitch change shaft 112 moves relative to the fluid supply shaft along the hub axis A. The hydraulic actuation system 200 may include a pump assembly 196 positioned in a non-rotating portion of the rotary wing aircraft 10 and configured to pressurize the hydraulic fluid and direct it into the chambers 162, 164, for example, via the inner shaft 190 and the outer shaft 192. The hydraulic fluid may be supplied to a hydraulic rotary coupling/slip ring 198 (e.g., a rotary union), which allows the hydraulic fluid to be delivered to the rotating components of the hydraulic actuation system 200, including the inner shaft 190, the outer shaft 192, and the chambers 162, 164. The outer supply shaft 189 may have a similar arrangement so that the hydraulic fluid can flow through hydraulic lines (e.g., hydraulic fluid channels, hydraulic fluid pathways, etc.) in the outer supply shaft, through the openings 188, and into the corresponding hydraulic lines or channels in the fluid supply shaft 182.

The rotary wing aircraft 10 and/or the hydraulic actuation system 200 may include a controller 202 configured to control the pump assembly 196. The controller 202 may be, for example, a flight control computer that may receive inputs from the flight controls (e.g., a collective control, a cyclic control, a throttle, etc.) as well as sensor data (e.g., pitot tubes, accelerometers, etc.) and may send instructions, based on the inputs and sensor data, to the pump assembly to adjust the pressure in the chambers 162, 164 in order to adjust the pitch of the propulsor blades 43. In some embodiments, the controller 202 may be a component of the pump assembly 196 and may receive instructions from a flight control computer of the aircraft 10. The controller 202 may then control the pump assembly to adjust the pressure in the chambers 162, 164 in order to adjust the pitch of the blades 43. The pump assembly 196 may include one or more pumps configured to pressurize hydraulic fluid and valves configured to control the flow of hydraulic fluid into and out of the pump assembly 196.

Figure 5A:
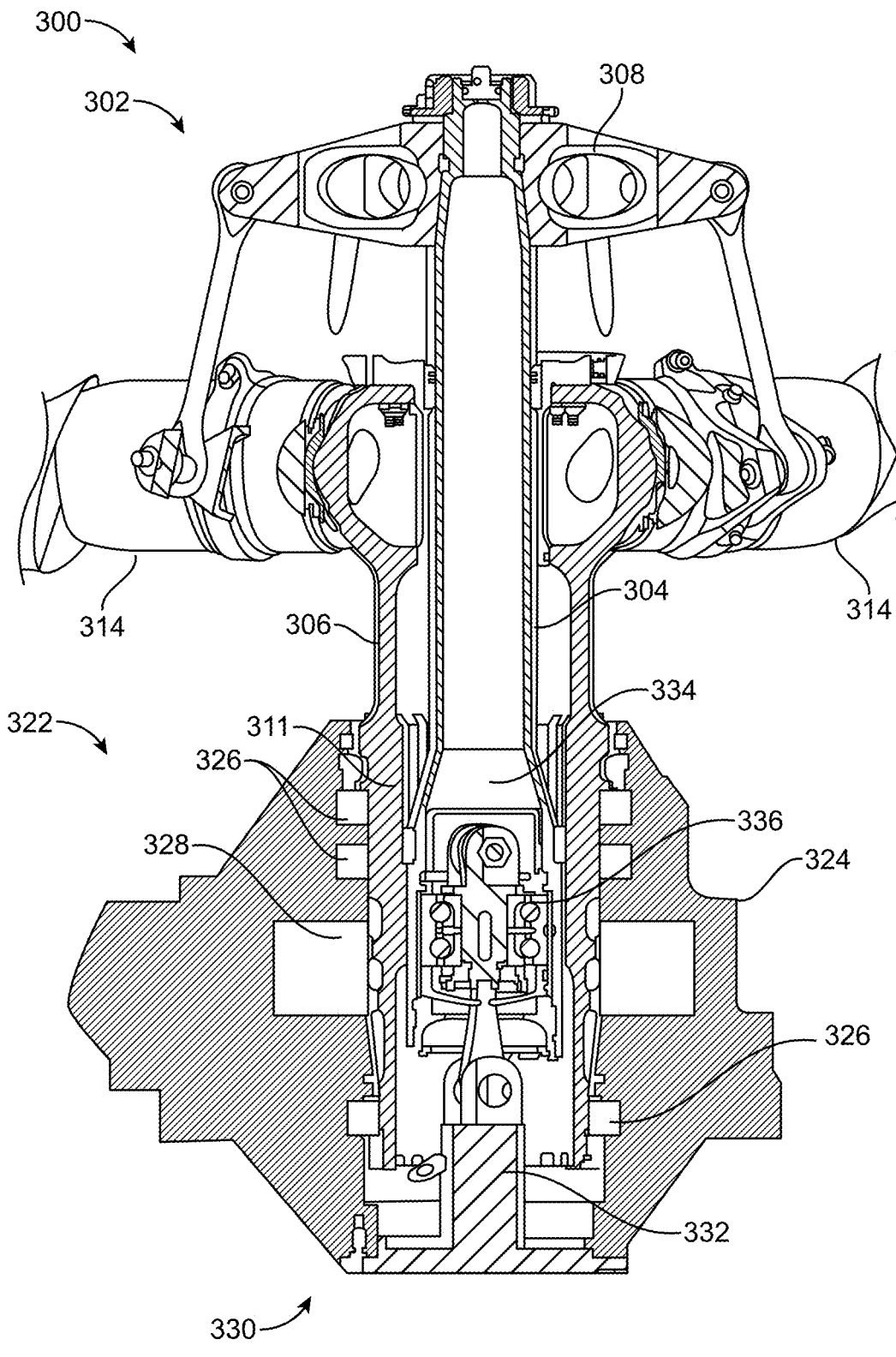
FIG. 5A is a section view of a prior art propulsor assembly.
Figure 5B:
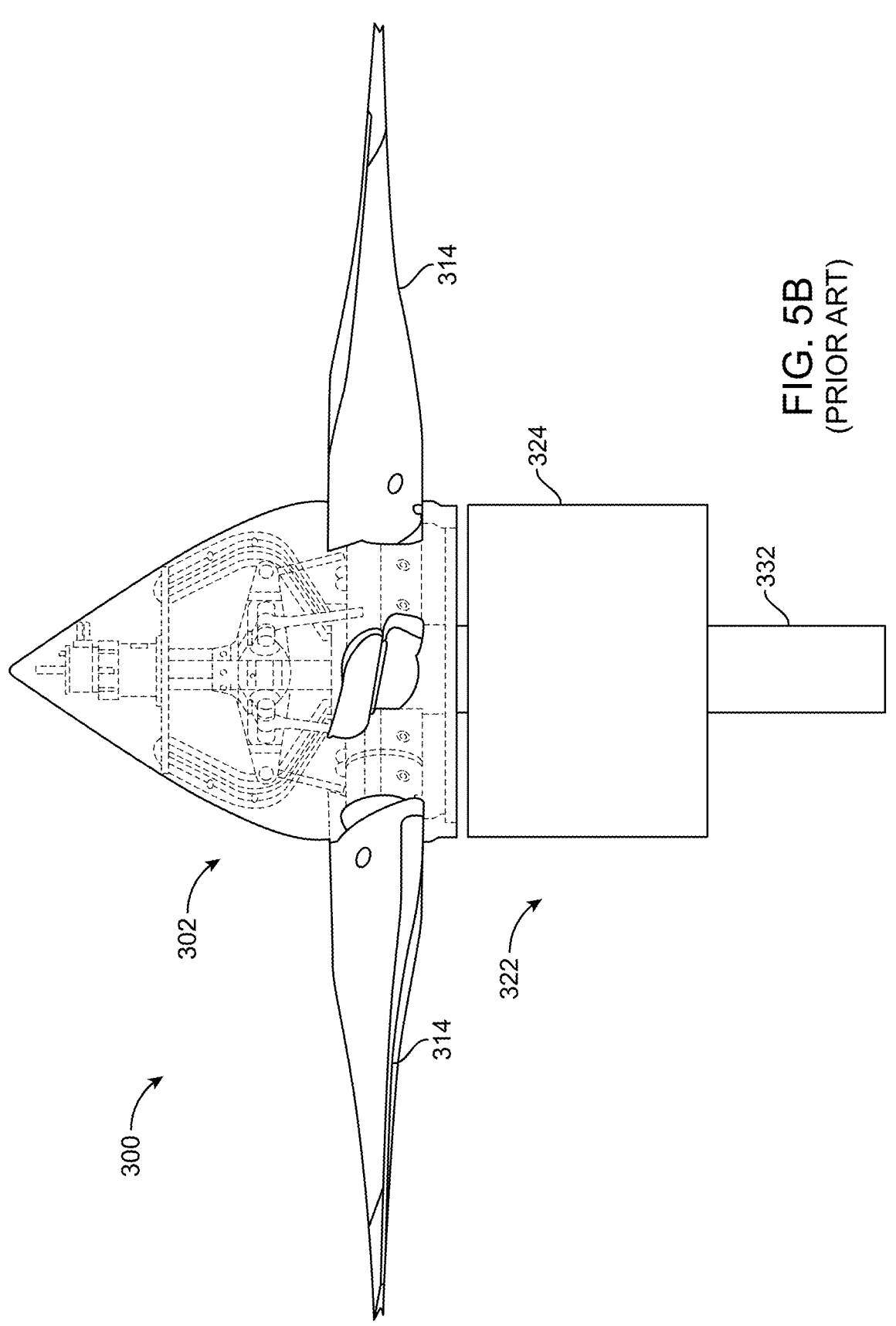
FIG. 5B is a side view of the prior art propulsor assembly of FIG. 5A.

Referring now to FIGS. 5A and 5B, a section view and a side view of a conventional propulsor assembly 300 of a rotary wing aircraft are shown, respectively. The conventional propulsor assembly 300 includes a propulsor hub assembly 302, including a pitch change shaft 304 extending through a hub body 306 and a pitch beam 308 coupled to the distal end of the pitch change shaft 304. The pitch change shaft 304 is configured to translate along its longitudinal axis to adjust the pitch of the blades 314. The hub body 306 includes a hub root 311. The hub root 311 extends along the longitudinal axis away from the pitch beam 308 into a drive assembly 322. The hub root 311 is rotatably coupled to the drive assembly housing 324 (e.g., a gearbox housing) by bearings 326. The propulsor hub assembly 302 is configured to rotate about the longitudinal axis of the hub root 311 relative to the drive assembly housing 324 and the other non-rotating components of the aircraft. The hub root 311 is coupled to a drive gear assembly 328, which transmits power from a motor or engine of the aircraft to drive the rotation of the propulsor hub assembly 302. The conventional propulsor assembly 300 includes an actuator system 330 configured to move the pitch change shaft 304 along its longitudinal axis. The actuator system 330 includes a linear actuator 332 (e.g., an electromechanical actuator or equivalent) coupled to an internal cavity 334 of the pitch change shaft 304 by a bearing assembly 336. The bearing assembly 336 is needed to allow the pitch change shaft 304 to rotate relative to the linear actuator 332. The bearing assembly 336 requires the diameters of the pitch change shaft 304 and the hub root 311 to be increased, which further increases the size of the drive gear assembly 328, bearings 326, and housing 324. The additional components (e.g., the linear actuator 332, the bearings 326, the bearing assembly 336) and increased component sizes adds additional weight to the aircraft, which can reduce efficiency and performance.

Referring now to FIG. 6, a section view of a propulsor assembly 42 incorporating the exemplary propulsor hub system 100 is shown, according to some embodiments. The propulsor assembly 42 includes a housing 424, a drive gear assembly 428 configured to transmit power from a motor or engine of the aircraft 10 to drive the rotation of the propulsor hub system 100, and bearings 426 configured to allow the propulsor hub system 100 to rotate relative to the housing 424. The outer supply shaft 189 may extend from the hydraulic rotary coupling (or hydraulic slip ring) 198, through the gearbox housing assembly 424 to 198 the canister body 172 to deliver fluid to the fluid supply shaft 182. The propulsor hub system 100 may be enclosed by a spinner 430 configured to protect the propulsor hub components and to improve the aerodynamic properties of the system. Because the propulsor hub system 100 uses a hydraulic actuation system positioned within the hub bowl 106 and utilizes a hydraulic rotary coupling (or hydraulic slip ring) 198, the propulsor assembly 42 does not require a pitch change shaft bearing assembly (e.g., bearing assembly 336) or an electromechanical actuator (e.g., linear actuator 332) and does not require the pitch change shaft 112 to extend into the gearbox housing assembly 424.

The guide rods 130 further reduce the need for the pitch change shaft 112 to resist bending. The pitch change shaft 112 can therefore be shorter in length and have a smaller diameter than the prior art pitch change shaft 304. Further, the diameter of the hub root 148 is reduced compared to the hub root 311 of the conventional propulsor assembly 300. Because the diameter of the hub root 148 is reduced, the drive gear assembly 428, bearings 426, and housing 424 of the propulsor assembly 400 can also be reduced in size relative to the drive gear assembly 328, bearings 326, and housing 324 of the conventional propulsor assembly 300. The reduction in component size results in a reduction in weight of the propulsor assembly 42 and thus an overall reduction in the weight of the aircraft 10. The reduction in aircraft weight can result an in increase in aircraft efficiency.

Further, in some embodiments, the hub system 100 may also be used to adjust the pitch of a tail rotor or any other rotor system that does not require cyclic pitch control. For example, rather than positioning the propulsor hub system 100 such that the axis of rotation A extends parallel to the roll axis, the hub system 100 may be positioned such that the axis of rotation A extends parallel to the pitch axis (e.g., in a tail rotor configuration). The propulsor blades 43 may instead be rotor blades configured to generate a sideways thrust to counteract rotation forces on of the fuselage caused by a main rotor assembly.

Computer Implemented Controller

The controller 202 mentioned above may be implemented via a microprocessor, processor, microcomputer or computer according to some embodiments. The controller 202 may include a processing circuit having a processor and a memory device and may be configured to communicate with one or more sensors.

In one configuration, the processing circuit may be embodied as a machine or computer-readable medium that is executable by a processor, such as processor. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits or otherwise share the same processor which, in some example embodiments, may execute instructions stored, or otherwise accessed, via different areas of memory. Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device may be communicably connected to the processor to provide computer code or instructions to the processor for executing at least some of the processes described herein. Moreover, the memory device may be or include tangible, non-transient volatile memory or non-volatile memory. Accordingly, the memory device may include database components, object code components, script components, or any other type of information structure for supporting the various activities and information structures described herein.

CONFIGURATION OF EXAMPLE
EMBODIMENTS

While this specification contains specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

What is claimed is:

1. A rotor assembly for a rotor blade for a rotary wing aircraft, the rotor assembly comprising:

a rotor hub comprising a hub arm and a central opening;

a hydraulic actuation cylinder positioned in the central opening;

a pitch change shaft assembly comprising a pitch change shaft positioned partially within the hydraulic actuation cylinder;

a pitch beam coupled to a distal end of the pitch change shaft and configured to be coupled to the rotor blade rotatably mounted to the hub arm; and at least one guide rod coupled to the rotor hub and in sliding contact with an opening in the pitch beam, wherein the at least one guide rod extends across an inner cavity of the rotor hub.

2. The rotor assembly of claim 1, wherein the at least one guide rod comprises a plurality of guide rods.

3. The rotor assembly of claim 2, further comprising a guide rod alignment plate coupled to a distal end of each of the plurality of guide rods.

4. The rotor assembly of claim 1, wherein the pitch change shaft assembly includes a piston coupled to a proximal end of the pitch change shaft, the piston being slidably engaged with and shaped to form a seal with an inner wall of the hydraulic actuation cylinder.

5. The rotor assembly of claim 4, wherein the piston separates an inner cavity of the hydraulic actuation cylinder into a first chamber and a second chamber, wherein when the first chamber is pressurized relative to the second chamber, the pitch change shaft extends farther away from the hydraulic actuation cylinder, and wherein when the second chamber is pressurized relative to the first chamber, the pitch change shaft retracts farther into the hydraulic actuation cylinder.

6. The rotor assembly of claim 5, further comprising a fluid supply shaft slidably coupled to the pitch change shaft.

7. The rotor assembly of claim 6, wherein the fluid supply shaft comprises:

an outer shaft configured to supply hydraulic fluid to one of the first chamber or the second chamber; and an inner shaft disposed within the outer shaft and configured to supply hydraulic fluid to other of the first chamber or the second chamber.

8. A propeller assembly for a rotary wing aircraft, the propeller assembly comprising:

a rotor hub configured to be rotated along a rotor axis by an engine or a motor, the rotor hub comprising a hub arm;

a rotor blade rotatably coupled to the hub arm about a hub arm axis; a pitch change shaft configured to translate along the rotor axis;

a pitch beam coupled to the pitch change shaft and comprising a first arm extending radially from the pitch change shaft;

a first guide rod fixedly coupled to the rotor hub and in sliding contact with the pitch beam, the first guide rod extending parallel to the rotor axis, wherein the first guide rod extends across an inner cavity of the rotor hub; and a pitch link coupled to a distal end of the first arm of the pitch beam and to the rotor blade, the pitch link configured to rotate the rotor blade about the hub arm axis to adjust a pitch of the rotor blade when the pitch change shaft translates along the rotor axis.

9. The propeller assembly of claim 8, further comprising a piston slidably coupled to a hydraulic cylinder, the piston coupled to a proximal end of the pitch change shaft.

10. The propeller assembly of claim 9, wherein the piston divides an internal cavity of the hydraulic cylinder into a first chamber and a second chamber, wherein when the first chamber is pressurized relative to the second chamber, the piston moves the pitch change shaft in a first direction along the rotor axis, and wherein when the second chamber is pressurized relative to the first chamber, the piston moves the pitch change shaft in a second direction opposite the first direction.

11. The propeller assembly of claim 10, further comprising a first hydraulic line fluidly coupled to the first chamber of the internal cavity of the hydraulic cylinder and a second hydraulic line fluidly coupled to the second chamber of the internal cavity of the hydraulic cylinder.

12. The propeller assembly of claim 11, further comprising a propeller shaft configured to couple the propeller assembly to the motor or the engine, wherein the first hydraulic line and the second hydraulic line extend through the propeller shaft.

13. The propeller assembly of claim 11, further comprising a fluid supply shaft positioned along the rotor axis and extending into a bore of the pitch change shaft, wherein the first hydraulic line extends through the fluid supply shaft to the first chamber of the internal cavity, and the second hydraulic line extends through the fluid supply shaft to the second chamber of the internal cavity.

14. The propeller assembly of claim 8, further comprising:

a second guide rod fixedly coupled to the rotor hub and slidably coupled to the pitch beam; and an alignment plate coupled to a distal end of the first guide rod and a distal end of the second guide rod, wherein the pitch beam is positioned between the alignment plate and the rotor hub.

15. A rotary wing aircraft comprising:

a fuselage;

a main rotor assembly coupled to the fuselage comprising at least one main rotor blade configured to be coupled to a main rotor hub; and a propulsor assembly coupled to the fuselage and comprising:

a hydraulic pump;

an engine or a motor configured to rotate a propulsor rotor hub about a propulsor rotor axis, the propulsor rotor hub comprising a rotor shaft and a central opening each positioned around the propulsor rotor axis;

a hydraulic actuation cylinder positioned in the central opening of the propulsor rotor hub and comprising an inner cavity;

a first hydraulic line extending through the rotor shaft from the hydraulic pump to a first chamber of the inner cavity of the hydraulic actuation cylinder;

a second hydraulic line extending through the rotor shaft from the hydraulic pump to a second chamber of the inner cavity of the hydraulic actuation cylinder; and a pitch change assembly configured to translate along the propulsor rotor axis in response to a difference in hydraulic pressure between the first chamber and the second chamber, wherein a proximal end of the pitch change assembly is positioned in the inner cavity of the hydraulic actuation cylinder, the pitch change assembly comprising:

a piston coupled to a proximal end of a pitch change shaft, the proximal end of the pitch change shaft defining the proximal end of the pitch change assembly;

a pitch beam coupled to a distal end of the pitch change shaft; and a first guide rod fixedly coupled to the propulsor rotor hub and in sliding contact with the pitch beam, the first guide rod extending parallel to the propulsor rotor axis, wherein the first guide rod extends across an interior cavity of the propulsor rotor hub.

16. The rotary wing aircraft of claim 15, wherein the pitch change shaft comprises a longitudinal bore extending distally from the proximal end of the pitch change shaft, wherein the rotary wing aircraft further comprises a fluid supply shaft extending into the longitudinal bore and slidably coupled to the pitch change shaft, wherein the first hydraulic line and the second hydraulic line are positioned within the fluid supply shaft.

17. The rotary wing aircraft of claim 15, wherein the first guide rod is coupled at a proximal end to the propulsor rotor hub and extends through a first opening in the pitch beam.

18. The rotary wing aircraft of claim 17, further comprising:

a second guide rod coupled at a proximal end to the propulsor rotor hub and extending through a second opening in the pitch beam;

a third guide rod coupled at a proximal end to the propulsor rotor hub and extending through a third opening in the pitch beam; and an alignment plate coupled to a distal end of the first guide rod, a distal end of the second guide rod, and a distal end of the third guide rod.

* * * * *